United States Patent
Adibi

(10) Patent No.: US 10,785,374 B1
(45) Date of Patent: Sep. 22, 2020

(54) OPTIMIZED DYNAMIC NUMBER INSERTION (DNI)

(71) Applicant: Talkdesk, Inc., San Francisco, CA (US)

(72) Inventor: Jafar Adibi, Los Angeles, CA (US)

(73) Assignee: TALKDESK INC., San Francisco, CA (US)

( * ) Notice: Subject to any disclaimer, the term of this patent is extended or adjusted under 35 U.S.C. 154(b) by 0 days.

(21) Appl. No.: 16/670,310

(22) Filed: Oct. 31, 2019

(51) Int. Cl.
| | | |
|---|---|---|
| *H04M 7/12* | (2006.01) | |
| *H04M 3/523* | (2006.01) | |
| *G06N 20/00* | (2019.01) | |
| *G06Q 30/02* | (2012.01) | |
| *G06N 5/04* | (2006.01) | |

(52) U.S. Cl.
CPC .............. *H04M 7/128* (2013.01); *G06N 5/04* (2013.01); *G06Q 30/0246* (2013.01); *G06Q 30/0277* (2013.01); *H04M 3/5235* (2013.01); *G06N 20/00* (2019.01)

(58) Field of Classification Search
CPC . H04M 3/5235; H04M 7/128; G06Q 30/0246
USPC .......... 379/245, 242, 207.14, 201.01, 207.02
See application file for complete search history.

(56) References Cited

U.S. PATENT DOCUMENTS

| | | | |
|---|---|---|---|
| 7,894,587 B1* | 2/2011 | Laurinavichus .... | H04M 3/5235 379/142.01 |
| 9,875,141 B2* | 1/2018 | Hellerstein .......... | G06F 9/5061 |
| 2009/0262917 A1* | 10/2009 | Delacey .............. | H04M 3/5191 379/211.02 |

* cited by examiner

Primary Examiner — Thjuan K Addy

(57) ABSTRACT

Optimizing a number pool for dynamic number insertion (DNI) used for call attribution is achieved by considering physical characteristics of the DNI number assigned to a specific channel versus characteristics of consumers within that channel—such as by determining a plurality of distinguishable consumer parameters having a business-positive correlation to a subset of numbers from among the pool of numbers—in order to make more optimized DNI number assignments.

20 Claims, 5 Drawing Sheets

OPTIMIZED DYNAMIC NUMBER INSERTION (DNI)

BACKGROUND

As known and appreciated by skilled artisans, in DNI-based call attribution (for internet-based advertising channels) it is possible (e.g., via JavaScript) to insert a specific phone number into internet-based advertisements when used for a specific channel that corresponds to the specific phone number. Conventionally, the specific phone numbers that are assigned to a channel come from a pool of reusable phone numbers and are dynamically inserted into web page ads. The specific number assigned to any specific channel can initially be selected at random when assigned to each such web page and then used for presentation of that ad in that channel from that point forward. As such, when a specific phone number is placed in an advertisement for a specific channel—and the same specific phone number is subsequently inserted into future presentations of the same advertisement in the same channel—the assignment and insertion of the specific number is based only on the channel corresponding to the advertisement being presented.

However, DNI phone number assignment and utilization does not consider the phone number itself with regard to the channel for which it is assigned, nor does it consider demographic information of the channel itself when selecting a number to assign, and thus misses benefits that could be derived from more deliberate and considered assignment of specific phone numbers to specific channels for increased consumer calls and resulting sales and revenue. For example, if a channel largely comprises baby boomers, and if the DNI number assignment system determines or is made aware that baby boomers are more likely to dial a number associated with an ad if it is a toll-free number (e.g., an "800" number or equivalent), then the DNI number assigned to that channel should be a toll-free number. Conversely, if a channel largely comprises millennials, and if the DNI number assignment system determines or is made aware that millennials are less likely to dial a number associated with an ad if it is a toll-free number (e.g., an "800" number or equivalent), then the DNI number assigned to that channel should be a regular area code number (and not a toll-free number). Similarly, the system might determine that a channel largely comprises religious individuals who are adverse to uses and instances of the number "666" (for its symbolic association with evil) and therefore should not utilize phone number with three running sixes.

SUMMARY

Disclosed are various implementations directed to optimizing a number pool for dynamic number insertion (DNI) used for call attribution by considering physical characteristics of the DNI number assigned to a specific channel versus characteristics of consumers within that channel to make more optimized DNI number assignments.

More specifically, disclosed herein are various implementations directed to systems, processes, methods, and other implementations for optimizing a number pool for dynamic number insertion (DNI) used for call attribution, for example, comprising: analyzing historic utilization of a DNI number pool; determining a plurality of distinguishable consumer parameters having a business-positive correlation to a subset of numbers from among the pool of numbers; identifying more optimum DNI number characteristics corresponding to the plurality of distinguishable consumer parameters and the subset of numbers; modifying the DNI number pool based on the more optimum DNI number characteristics; and modifying DNI number selection rules based on the modified DNI number pool.

Certain implementations disclosed herein may further comprise analyzing aggregate context information corresponding to the historic utilization of the DNI number pool so that determining a plurality of distinguishable consumer parameters having a positive correlation to a subset of numbers from among the pool of numbers is based at least in part on the analysis of the context information. Select implementations may further comprise modifying a cross-channel call attribution rule based at least in part on the analysis of the context information.

Further disclosed herein are various alternative implementations directed to one or more of the following: wherein modifying the DNI number pool comprises the addition of at least one new number to the DNI number pool; wherein modifying DNI number selection rules comprises the addition of a rule for utilizing the at least one new number added to the DNI number pool; wherein modifying DNI number selection rules comprises the addition of a rule for utilizing the at least one new number for more than one channel; wherein analyzing historic utilization of a DNI number pool includes aggregate information on cross-channel call attribution.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings.

DETAILED DESCRIPTION

Figure 1:
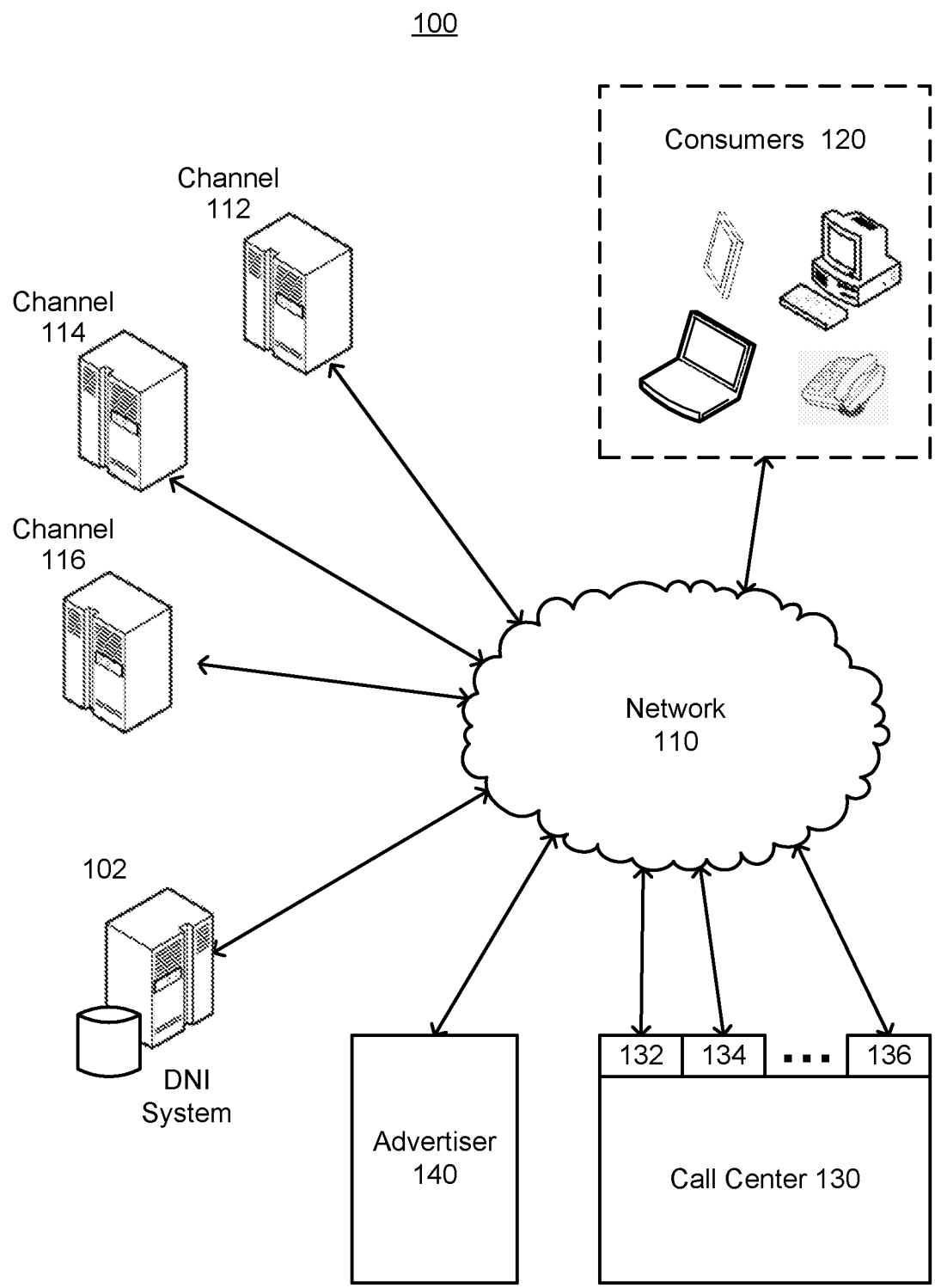
FIG. 1 is a block diagram illustrating an exemplary network-based advertising delivery infrastructure pertaining to various implementations described herein.

Certain terms used herein may also be used interchangeably with other terms used herein and such terms should be given the broadest interpretation possible unless explicitly noted otherwise. For example, as used herein, the terms "distributed" and "decentralized" are used interchangeably and the use of either term is intended to fully include the meaning of the other term without limitation.

An understanding of various concepts are helpful to a broader and more complete understanding of the various implementations disclosed herein, and skilled artisans will readily appreciate the implications these various concepts have on the breath and depth of the various implementations herein disclosed.

Call Attribution and Dynamic Number Insertion

As well-known and readily-appreciated by skilled artisans, basic "call attribution" is a method for tracking advertising efforts at various levels of granularity through the utilization of unique phone numbers assigned to a plurality of defined advertising "channels" such that, when a consumer calls in, the specific channel that originates, generates, or is attributable for the consumer's call can be ascertained by the specific phone number used by the consumer. For web-based advertising, dynamic number insertion (DNI) is also well-known and readily-appreciated by skilled artisans as a method for call attribution in network-, web-, or Internet-based advertising delivery.

More specifically, call attribution can be used to differentiate between different advertising campaigns, different advertisements, different advertising media, and so forth. For example, advertisement A may have one call-in number #1 and advertisement B might have call-in number #2 when published in magazine X, but both A and B might have different numbers when published in magazine Y, and different numbers again when published in newspaper Z, wherein each unique dial-in number defines a unique channel for call attribution. In addition, different numbers might also be used for different advertising periods (e.g., first week, second week, etc.) and other measurable advertising differentiators (or parameters) that define different advertising channels.

For web-based advertising, dynamic number insertion (DNI) is also well-known and readily appreciated by skilled artisans. DNI is the utilization of a plurality of unique phone numbers from a reusable pool of phone numbers that are dynamically inserted into a web page ad presented to a consumer based on any of several different factors pertaining to the web page ad. For example, an ad appearing on one website might use phone number #101 while the same ad appearing on another website might use phone number #102, and so forth. Similarly, an ad appearing on one website on one day might use phone number #101 while the same ad appearing on the same website on another day might use phone number #201, and so forth.

Because the webpage view for a consumer is effectively generated at the moment the consumer requests it, the ad can be dynamically generated with a unique phone number at the time the webpage view is generated. In this manner, the specific web-based channel attributable for a consumer call to the company can be similar ascertained, and the phone number for the web-based ad can be returned to the reusable pool for reutilization once certain conditions or thresholds are met.

For both traditional call attribution and DNI-based call attribution, it is not uncommon for an advertisement presented in one channel (the intended channel) being transferred to another channel (and unintended channel). For example, a consumer might take an image of an ad presented to the consumer on a retail website (the intended channel) and then post that image on a social media platform (creating a new and unknown unintended channel) where said ad is then seen by a second consumer on the social media platform, and it is the second consumer (not the first consumer) that calls the company using the number. Since the second consumer did not in fact utilize the retail website (i.e., did not get the phone number from the intended channel), attributing the call from the second consumer to the retail website would be inaccurate.

Context Awareness

Various implementations disclosed herein are directed to context-aware dynamic determinations for DNI insertion of phone numbers into web-based advertisements where different phone numbers are assigned and deployed (e.g., using JavaScript or other approaches) based on both the channel and the context in which the advertisement being deployed. For example, for a specific internet-based channel (e.g., on a channel corresponding to a social media platform) that is predominantly utilized during the night by older consumers (who collectively make calls more often when a toll-free number is presented) but is predominantly utilized during the day by younger consumers (who collectively make calls more often when a traditional area code number is presented), an ad presented during nighttime hours could utilize a first phone number that is toll-free (e.g., area code 800) while the same ad used during daytime hours could utilize a typical area-code phone number (e.g. area code 302).

This type of time-based context for variable consumer demographics can be applied to other demographic contexts such as, for example, consumer location and other features related thereto (such as weather, local events, etc.). For example, if consumers in one location prefer local phone numbers, then a number with the local area code (e.g., area code 512) might be displayed in the ad, whereas in the same channel a number with a prestigious area code (e.g., area code 212) might be utilized in ads presented to consumers in another geographic location who are favorably inclined to call numbers having the prestigious area code.

The use of context in such a manner can be seen (and not incorrectly) as narrowing one channel into multiple distinguishable channels, but because context can extent across different channels, change more dynamically than more fixed attributes used to differentiate channels, and so forth, the concept of context is a convenient construct for enhanced DNI utilization. For example, for certain contexts a specific phone number might be utilized in more than one channel, such as in a power-outage context when normal use of phones (both landline and mobile phones) is disrupted and general channel differentiation is not as useful as event-specific context differentiation, or when the advertisers online operations are disrupted and call-in customer activity is skewed upward as a result.

DNI Assignment Optimization

The various implementations disclosed herein seek to use all available data (such as to demographics, psychographics, call metadata, caller data, etc.) to determine the best phone number (that is, the best pattern for a phone number) for utilization in specific channels. By gathering together advertisements, phone numbers, and context data, a system can analyze said data to determine which patterns provided best results for which advertisements in which contexts utilizing certain phone numbers in lieu of other phone numbers. For example, the system learns using 888 number has better effect on baby boomers (i.e., more likely to get baby boomers to respond to an ad that has a toll-free phone number), while using a 310 area code is more attractive to millennials (i.e., younger people are more likely to respond to an ad with a regular area code).

Advertising Delivery Infrastructure

FIG. 1 is a block diagram illustrating an exemplary network-based advertising delivery infrastructure pertaining to various implementations described herein. In FIG. 1, a communications network 110 operationally couples consumers 120 to a call center 130, an advertiser 140, a DNI system, and various content delivery servers 112, 114, 116 for delivery of web-based content including but not limited to commercial websites, social media platforms, communication applications, news feeds, data resources, and so forth. The advertiser 140 may be a retail company (or an entity acting on behalf of a retail company) and is associated with both the call center 130 and the DNI system. The call center 140 may be configured to receive calls made to several different phone numbers 132, 134, 136 and the DNI system 150 is configured to insert these different phone numbers 132, 134, 136 into advertisements generated by the content delivery servers 112, 114, 116 on behalf of the advertiser 140 for presentation to consumers 120. Consumers 120, responding to the advertisements they receive from the content delivery servers 112, 114, 116, may then call the call center 130 using the specific phone number provided to them in the ad that they received. In this manner, the call center 130 can identify the specific advertisement, and the specific channel for that advertisement, that led each customer 120 to call the call center 130.

In more general terms, consumers 120 may interact with a call center 130 using voice, email, text, and web interfaces in order to communicate with agents (not shown) through a network 110. Agents may be remote from the call center 130 and handle communications with consumers 120 on behalf of an advertiser 140. Consumers 120 may communicate using a plurality of devices including but not limited to a telephone, a mobile smartphone, a tablet, a laptop, a desktop computer, or other such devices. In particular, telephone-based communication may traverse the network 110 as a public switched telephone networks (PSTN), Voice over Internet Protocol (VoIP) telephony (via the Internet), etc. The network types are provided by way of example and are not intended to limit types of networks used for communications.

The call center 130 be in a single location or may be distributed over a plurality of locations and may comprise it own servers, databases, and other components. In particular, the call center 130 may include automated call distribution (ACD) systems, computer telephony integration (CTI) systems, and a plurality of databases for storing historical information, and business information (such as information pertaining to specific advertising campaigns), and technical information (such as routing data). The call center 130 may also include a variety of different servers such as email servers, instant messaging (IM) servers, social media servers, SMS servers, routing servers, SIP servers (as part of IP-based PBXs), outbound servers, statistics servers, and reporting/dashboard servers.

The call center 130 may include a number of other components. For example, the call center 130 may provide for speech analytics (e.g., post-call and real-time) to capture, structure and analyze unstructured phone conversations to uncover the reasons why people call, and to allow a company to identify and address an issue while the caller is still on the line. Call analytics may be used to extract information from customer calls for further analysis or action. Robotic process automation (RPA) may leverage artificial intelligent (AI), machine learning, workflow and other technologies to automate the processing of repetitive tasks, initiate actions and communicate with other systems or employees. RPA emulates the processes performed by human workers and can be trained to adapt to changing conditions, anomalies and new situations. Desktop analytics (DA) may capture, track and analyze events on the agent desktop. Real-time guidance/next-best action (NBA) tools may give agents the right information at the right time to deliver a personalized experience to each consumer.

Additionally, recording systems and related applications may be used to capture audio between consumers and agents and may also capture everything that happens during interactions and what agents do on their desktops. Surveying tools may also provide the ability to create and deploy post-interaction consumer feedback surveys in voice and digital channels.

Consumers 120 may initiate inbound telephone calls to the call center 130 via an end-user telephony device (e.g., landline phone or mobile phone) via one of several telephone numbers 132, 134, 136 utilized by the call center 130. For example, a consumer 130 calling on a telephone handset may connect through the PSTN and terminate on a private branch exchange (PBX).

Figure 2:
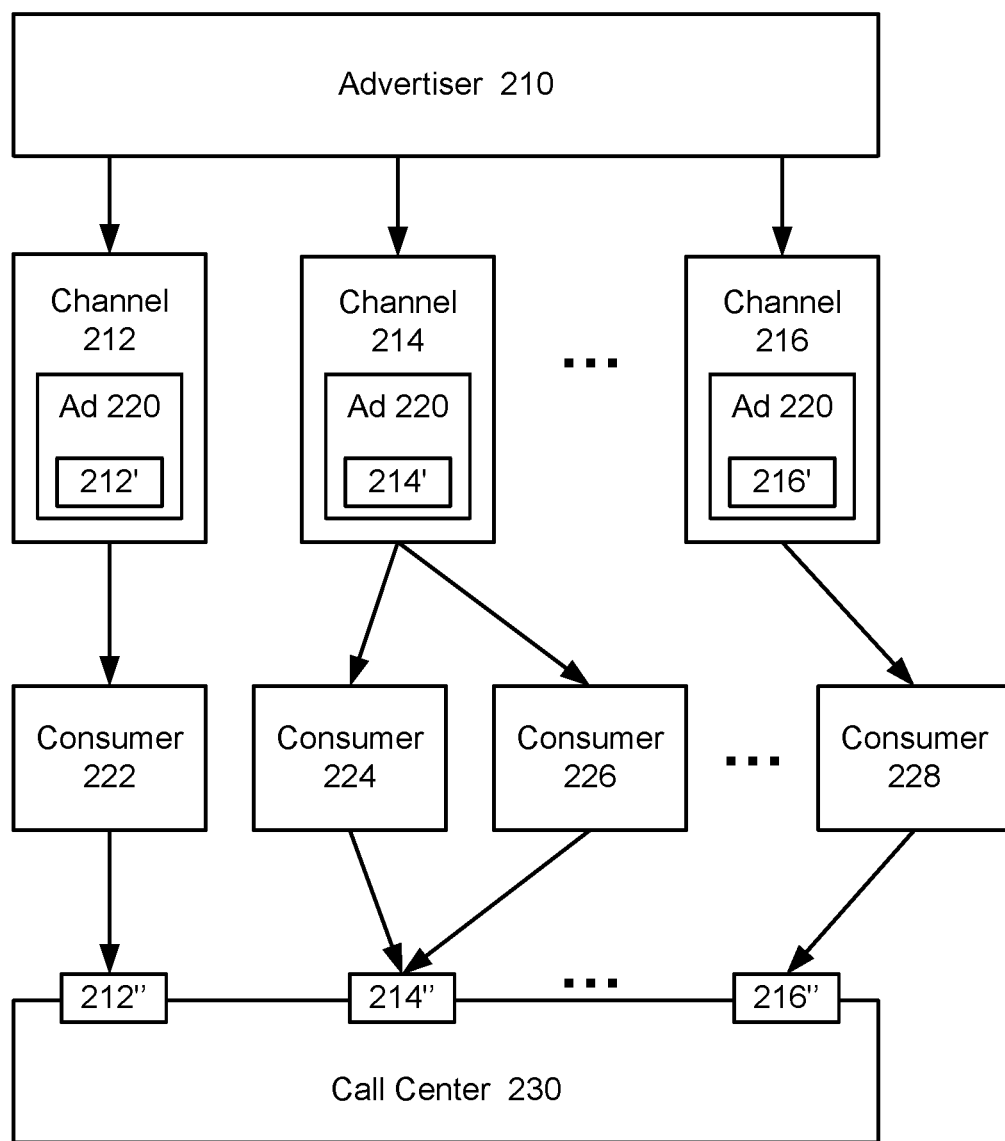
FIG. 2 is a modified block diagram illustrating traditional call attribution pertaining to various implementations described herein.

FIG. 2 is a modified block diagram 200 illustrating traditional call attribution pertaining to various implementations described herein. In FIG. 2, the advertiser 210 may define a plurality of channels 212, 214, 216 for distribution of advertising (or "ad") having included therein a channel-specific phone number 212', 214', 216'. For example, channel 212 may be magazine advertising, channel 214 may be newspaper advertising, and channel 216 may be billboard advertising. Of course these channels 212, 214, 216 need not be limited to print advertising but can include advertisements in any of a variety of different channels utilized today.

Consumers 222, 224, 226, 228 may receive the ad 220 with one of the channel-specific phone numbers 212', 214', 216', and the consumers 222, 224, 226, 228 may call the channel-specific phone number 212', 214', 216' on the ad they received. These calls are received at the call center 230 configured to receive calls corresponding to actual phone numbers 212", 214", 216" utilized by the call center 230.

As shown in FIG. 2, the channel-specific phone numbers 212', 214', 216' included in the ad 220 are intended identify the specific channel 212, 214, 216 where the ad 220 appeared that led consumers 222, 224, 226, 228 to call the call center 230. In this manner, the advertiser is able to ascertain how effective the ad 220 performed in each channel 212, 214, 216.

Figure 3:
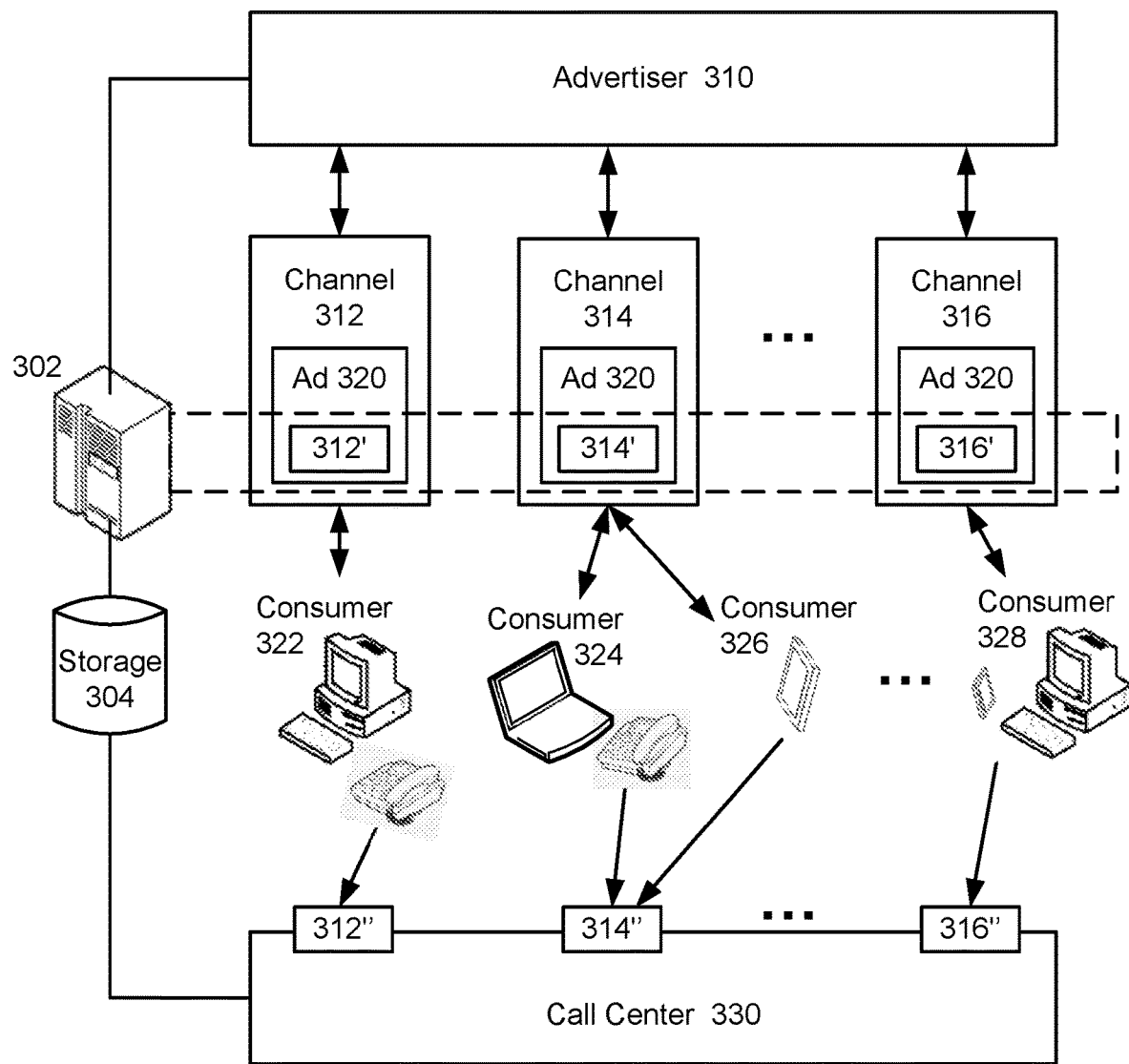
FIG. 3 is a modified block diagram illustrating DNI-based call attribution pertaining to various implementations described herein relative to the exemplary network-based advertising delivery infrastructure of FIG. 1.

FIG. 3 is a modified block diagram 300 illustrating DNI-based call attribution pertaining to various implementations described herein relative to the exemplary network-based advertising delivery infrastructure of FIG. 1. In FIG. 3, the advertiser 310 may define a plurality of network-based channels 312, 314, 316—such as, for example, different websites—for distribution of advertising ("ads") having included therein DNI-generated channel-specific phone number 312', 314', 316' provided by DNI server 302 based on a pool of advertiser phone numbers maintained in storage 304 and corresponding to each channel 312, 314, 316. For example, channel 312 may be a social media website (or group thereof), channel 314 may be a news media website (or group thereof), and channel 316 may be a search engine (or group thereof), among other possibilities. Of course these channels 312, 314, 316 need not be limited to websites but could also include a variety of other network-based delivery technologies. Accordingly, consumers 322, 324, 326, 328 may receive the ad 320 with one of the channel-specific phone numbers 312', 314', 316', and the consumers 322, 324, 326, 328 may call the channel-specific phone number 312', 314', 316' on the ad displayed in the channel they are utilizing. These calls are received at the call center 330 configured to receive calls corresponding to actual phone numbers 312", 314", 316" utilized by the call center 330.

As shown in FIG. 3, the channel-specific phone numbers 312', 314', 316' included in the ad 320 real-time by the DNI technology and are intended to identify the specific channel 312, 314, 316 where the ad 320 appeared that led consumers 322, 324, 326, 328 to call the call center 330. In this manner, the advertiser 310 is able to ascertain how effective the ad 320 performed in each channel 312, 314, 316 based on the calls received at the call center 330.

Context-Aware DNI

One approach for context-aware dynamic number insertion (DNI) for call attribution may comprise: receiving a DNI request from an ad-based content server; determining, from among a plurality of channels, a channel that corresponds to the ad-based content server; determining a context for the DNI request for the corresponding channel; and selecting, based on the determined context, a number from among a set of numbers corresponding to the channel for return to the ad-based content server. This approach may further comprise further comprising receiving context-related information from a source other than the ad-based content server so that the determining a context for the DNI request comprises analysis of the context-related information received from the source. This approach may also further comprise receiving context-related information from the ad-based content server so that the determining a context for the DNI request comprises analysis of the context-related information received from the ad-based content server.

Figure 4:
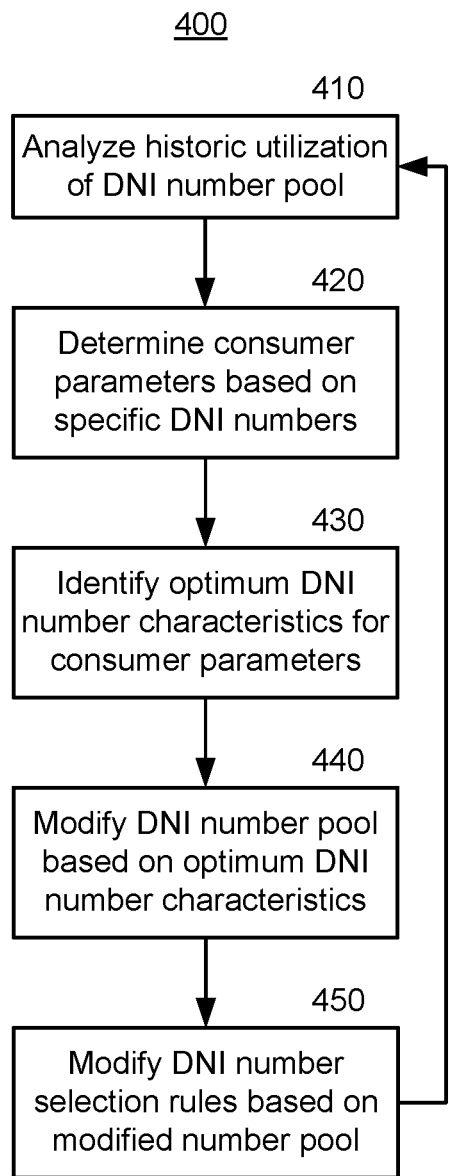
FIG. 4 is a process flow diagram illustrating optimization of a number pool for dynamic number insertion (DNI) used for call attribution representative of various implementations described herein.

FIG. 4 is a process flow diagram 400 illustrating optimization of a number pool for dynamic number insertion (DNI) used for call attribution representative of various implementations described herein. In FIG. 4, at 410 an optimizing system may analyze historic utilization of a DNI number pool with regard to its channels, consumers, and sales in light of various demographic information available. At 420 the system may then determine consumer parameters based on specific DNI numbers, for example, that channels predominantly serving consumers do not generate calls when associated with DNI number having certain patterns. At 430, the system then identifies more optimum DNI number characteristics based on the consumer parameters and, at 440, may modify the DNI number pool based on these more optimum DNI number characteristics. At 450 the system may also modify the DNI number selection rules (if necessary) based on the modified number pool such as, for example, selecting certain DNI numbers only for certain channels and preclude use of certain numbers for other certain channels.

Figure 5:
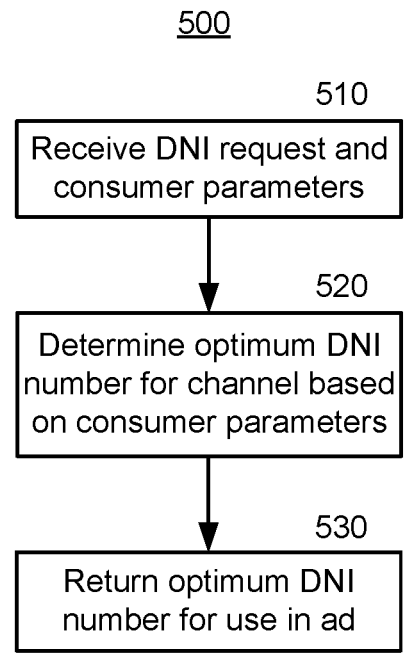
FIG. 5 is a process flow diagram illustrating utilization of an optimized dynamic number insertion (DNI) phone number representative of several implementations described herein.

FIG. 5 is a process flow diagram 500 illustrating utilization, by a DNI server for example, for real-time optimized dynamic number insertion (DNI) representative of several implementations described herein. In FIG. 5, at 510 the system receives a DNI request along with consumer parameters which, at 520, the system analyzes to determine an optimum DNI number for the requesting channel based on the consumer parameters provided and, at 530, returns the more optimized DNI number for use in the ad.

Figure 6:
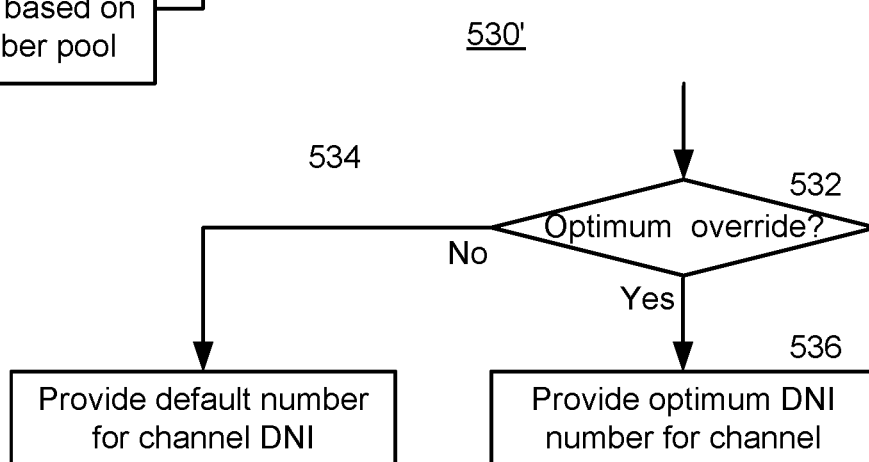
FIG. 6 is a partial process flow diagram illustrating override an optimizing of dynamic number insertion (DNI) for call attribution as an alternative to element 530 of FIG. 5 representative of certain implementations described herein.

FIG. 6 is a partial process flow diagram illustrating overriding an optimization of dynamic number insertion (DNI) for call attribution as an alternative to element 530 of FIG. 5 representative of certain implementations described herein. In FIG. 6, at 442 a determination is made as to whether an optimum number should be used to override the default (or random) selection of a DNI number for use with a specific channel. If yes, then the system provides a more optimum DNI number for use with the channel in lieu of the default (or randomly selected) phone number. If no, then the system provides the default number for the channel.

Computing Environment

Figure 7:
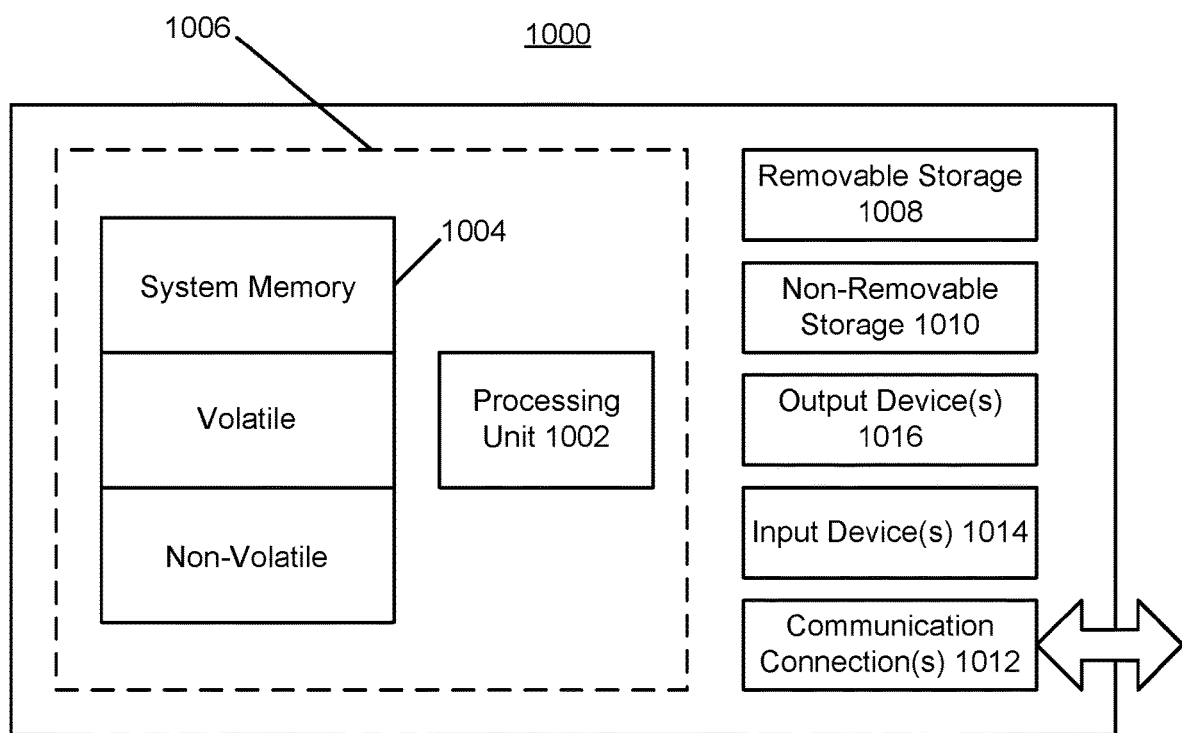
FIG. 7 is a block diagram of an example computing environment that may be used in conjunction with example implementations and aspects herein disclosed.

FIG. 7 is a block diagram of an example computing environment 1000 that may be used in conjunction with the various implementations herein disclosed. Computing environment 1000 is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 1000. In a basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This basic configuration is illustrated in FIG. 7 by dashed line 1006 as may be referred to collectively as the "compute" component.

Computing device 1000 may have additional features/functionality. For example, computing device 1000 may include additional storage (removable and/or non-removable) including, but not limited to, magnetic or optical disks or tape. Such additional storage is illustrated in FIG. 7 by removable storage 1008 and non-removable storage 1010.

Computing device 1000 typically includes a variety of computer readable media. Computer readable media can be any available media that can be accessed by device 1000 and include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, and so forth. Output device(s) 1016 such as a display, speakers, printer, and so forth may also be included. All these devices are well-known in the art and need not be discussed at length here.

Computing device 1000 may be one of a plurality of computing devices 1000 inter-connected by a network. As may be appreciated, the network may be any appropriate network, each computing device 1000 may be connected thereto by way of communication connection(s) 1012 in any appropriate manner, and each computing device 1000 may communicate with one or more of the other computing devices 1000 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

General Implementations

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding.

Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular implementations are described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by a computer processor and/or other components. Similarly, the term "computer-readable medium" refers to any storage medium that may be used to store computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims that follow.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A method for optimizing a number pool for dynamic number insertion (DNI) used for call attribution, the method comprising:
    analyzing historic utilization of a DNI number pool;
    determining a plurality of distinguishable consumer parameters having a business-positive correlation to a subset of numbers from among the pool of numbers;
    identifying more optimum DNI number characteristics corresponding to the plurality of distinguishable consumer parameters and the subset of numbers;
    modifying the DNI number pool based on the more optimum DNI number characteristics; and
    modifying DNI number selection rules based on the modified DNI number pool.

2. The method of claim 1, further comprising analyzing aggregate context information corresponding to the historic utilization of the DNI number pool, and wherein determining a plurality of distinguishable consumer parameters having a positive correlation to a subset of numbers from among the pool of numbers is based at least in part on the analysis of the context information.

3. The method of claim 1, wherein modifying the DNI number pool comprises the addition of at least one new number to the DNI number pool.

4. The method of claim 3, wherein modifying DNI number selection rules comprises the addition of a rule for utilizing the at least one new number added to the DNI number pool.

5. The method of claim 1, wherein modifying DNI number selection rules comprises the addition of a rule for utilizing the at least one new number for more than one channel.

6. The method of claim 1, wherein analyzing historic utilization of a DNI number pool includes aggregate information on cross-channel call attribution.

7. The method of claim 1, further comprising modifying a cross-channel call attribution rule based at least in part on the analysis of the context information.

8. A system for optimizing a number pool for dynamic number insertion (DNI) used for call attribution, the system comprising:
a memory;
a processor operatively coupled to the memory for:
analyzing historic utilization of a DNI number pool;
determining a plurality of distinguishable consumer parameters having a business-positive correlation to a subset of numbers from among the pool of numbers;
identifying more optimum DNI number characteristics corresponding to the plurality of distinguishable consumer parameters and the subset of numbers;
modifying the DNI number pool based on the more optimum DNI number characteristics; and
modifying DNI number selection rules based on the modified DNI number pool.

9. The system of claim 8, further comprising analyzing aggregate context information corresponding to the historic utilization of the DNI number pool, and wherein determining a plurality of distinguishable consumer parameters having a positive correlation to a subset of numbers from among the pool of numbers is based at least in part on the analysis of the context information.

10. The system of claim 8, wherein modifying the DNI number pool comprises the addition of at least one new number to the DNI number pool.

11. The system of claim 10, wherein modifying DNI number selection rules comprises the addition of a rule for utilizing the at least one new number added to the DNI number pool.

12. The system of claim 8, wherein modifying DNI number selection rules comprises the addition of a rule for utilizing the at least one new number for more than one channel.

13. The system of claim 8, wherein analyzing historic utilization of a DNI number pool includes aggregate information on cross-channel call attribution.

14. The system of claim 8, further comprising modifying a cross-channel call attribution rule based at least in part on the analysis of the context information.

15. A non-transitory computer-readable storage medium comprising computer-readable instructions for optimizing a number pool for dynamic number insertion (DNI) used for call attribution, the computer-readable instructions comprising instructions that cause a processor to:
analyze historic utilization of a DNI number pool;
determine a plurality of distinguishable consumer parameters having a business-positive correlation to a subset of numbers from among the pool of numbers;
identify more optimum DNI number characteristics corresponding to the plurality of distinguishable consumer parameters and the subset of numbers;
modify the DNI number pool based on the more optimum DNI number characteristics; and
modify DNI number selection rules based on the modified DNI number pool.

16. The computer-readable medium of claim 15, further comprising instructions for analyzing aggregate context information corresponding to the historic utilization of the DNI number pool, and wherein determining a plurality of distinguishable consumer parameters having a positive correlation to a subset of numbers from among the pool of numbers is based at least in part on the analysis of the context information.

17. The computer-readable medium of claim 15, further comprising instructions whereby modifying the DNI number pool comprises the addition of at least one new number to the DNI number pool.

18. The computer-readable medium of claim 17, further comprising instructions whereby modifying DNI number selection rules comprises the addition of a rule for utilizing the at least one new number added to the DNI number pool.

19. The computer-readable medium of claim 15, further comprising instructions whereby modifying DNI number selection rules comprises the addition of a rule for utilizing the at least one new number for more than one channel.

20. The computer-readable medium of claim 15, further comprising instructions whereby analyzing historic utilization of a DNI number pool includes aggregate information on cross-channel call attribution.

* * * * *